Nov. 27, 1928.
W. GANZ
1,692,825
LOCK
Filed May 13, 1927
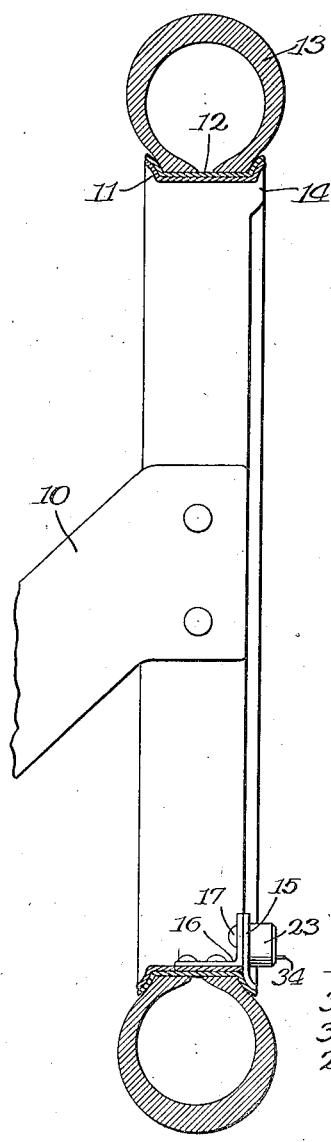
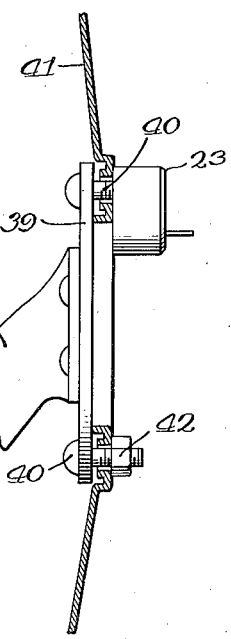
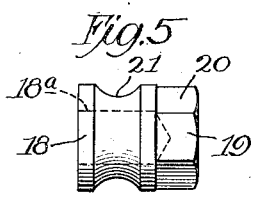
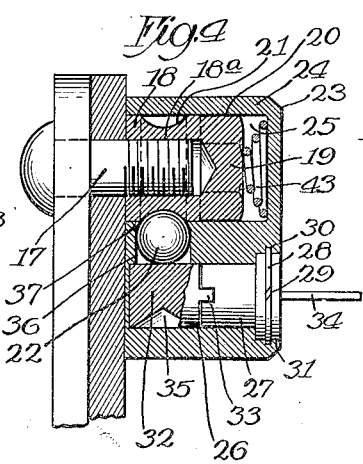
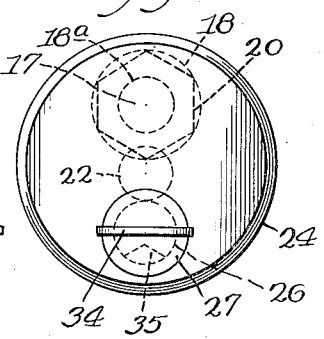
Inventor:
William Ganz
By Gillson, Manir & Cox,
Attys Patented Nov. 27, 1928.

1,692,825

UNITED STATES PATENT OFFICE.

WILLIAM GANZ, OF CHICAGO, ILLINOIS.

LOCK.

Application filed May 13, 1927. Serial No. 191,083.

This invention relates to locks and has for its principal object to provide a simple device that will effectually prevent the theft of automobile accessories, and the like, by making it impossible to remove the nut, or nuts, that secure such things in place.

The invention may be applied to other uses, and has other advantages that will appear as the disclosure proceeds and the description is read in connection with the accompanying drawings, in which—

Fig. 1 is a vertical sectional view through a conventional form of spare rim, tire and carrier;

Fig. 2 is a similar view of the inner portion of a disc wheel and its carrier;

Fig. 3 is an end elevation of a device embodying the invention and adapted to be applied to the carrier shown in Figs. 1 and 2;

Fig. 4 is a vertical sectional view through the device and a portion of the carrier, shown in Fig. 1, and Fig. 5 is a side elevation of a nut made according to this invention.

A conventional form of bracket 10 is shown in Fig. 1 supporting a conventional spare rim carrier 11 upon which is mounted a spare rim 12, equipped with a spare tire 13. The carrier 11, has one or more fixed lugs or clips 14 at its upper side, and a removable clip 15 at its lower side. The removable clip is clamped to an angle bracket 16 of the carrier by a bolt 17, which is provided with a nut 18.

In the preferred form the nut has a threaded bore 18ª opening at one end and closed at the other end as indicated at 19. The periphery adjacent to the closed end is provided with a wrench seat 20 and between the wrench seat and the opposite end a groove 21 is provided having a form suitable for cooperation with the rolling device, here illustrated as a ball 22, which, when the parts are in the position shown in Fig. 4, effects a swivel connection between the nut and a protecting device, generally indicated in Fig. 1 at 23.

The protecting device includes a casing 24 of suitable form and provided with two longitudinal bores 25 and 26, one end of each of which is closed. The bore 25 is of a diameter and length sufficient to accommodate the nut 20 with a reasonable amount of clearance and the bottom of this bore is provided with a spring 43 which bears against the end 19 of the nut and prevents rattling.

A lock barrel 27 is mounted in the bore 26 and secured to the casing 24 by a resilient split ring 28 which, during assembly, is compressed with a groove 29 in the barrel and expands into a groove 30 in a counter bore 31 of the bore 26. Also mounted in the bore 26 beyond the lock barrel is a plug 32, connected as indicated at 33, with the rotatable portion of the lock which is turned by a key 34, or held in locked position by tumblers (not shown) in a manner well known in the lock art. Plug 32 is provided with a conical recess 35 adapted to accommodate a portion of the ball 22 when it is desired to release the casing from the nut.

The ball 22 is movably mounted in a short connecting bore 36 between the bores 25 and 26. Its movement is limited in one direction by the plug and in the other direction by a flange 37, which may be formed by peening over the metal around the end of the bore 36.

In the relation illustrated in Figs. 1, 3 and 4, the spare rim and tire are put in place on the carrier; the nut 18 is applied and set up with a wrench; the key 34 is operated to put the recess 35 in position to receive the ball 22; the casing is slipped over the nut and the key turned to rotate the recess away from the ball; the casing is then free to swivel about the nut, but cannot be removed until the plug is again rotated to bring the recess 35 in position to receive the ball, when the casing may be removed to permit access to the nut.

In Fig. 2 a conventional form of bracket for carrying a spare wheel is shown at 38, equipped with a disk 39 carrying studs 40. adapted to receive the web 41 of a disk wheel which is secured in place by nuts 42, one of which may be replaced by the device shown in Figs. 3 and 4.

The device can be readily applied to existing vehicles and other things by merely discarding one of the usual nuts and replacing it with a nut provided with a groove to receive and cooperate with the ball 22.

I claim as my invention:

1. In a device of the class described, a shield having two cylindrical bores arranged in parallel relation and a transverse bore connecting the cylindrical bores, a ball mounted in the transverse bore and having a diameter greater than the distance between the two bores, a lock mechanism in one of the bores including means for forcing the ball to project into the other bore.

2. In a device of the class described, a shield having a bore adapted to receive a fastening to be protected, said shield also having a second bore spaced from the first and a third bore establishing communication between the first and the second bore, a ball mounted in the third bore and having a diameter in excess of the length of such bore, shifting means mounted in the second bore adapted in one position to project the ball into the first bore and in another position to permit the ball to be withdrawn from the first bore, and a lock for controlling the shifting means.

In testimony whereof I affix my signature.

WILLIAM GANZ.